United States Patent [19]

Richard

[11] 4,156,644

[45] May 29, 1979

[54] PULSATING SLUDGE BED WITH INCLINED PLATES

[75] Inventor: Yves-Robert Richard, Marly-le-Roi, France

[73] Assignee: Societe Degremont, Rueil-Malmaison, France

[21] Appl. No.: 857,194

[22] Filed: Dec. 2, 1977

Related U.S. Application Data

[63] Continuation of Ser. No. 782,499, Mar. 29, 1977, abandoned, which is a continuation-in-part of Ser. No. 600,562, Jul. 30, 1975, abandoned, which is a continuation of Ser. No. 380,732, Jul. 19, 1973, abandoned.

[51] Int. Cl.² .............................................. C02B 1/78
[52] U.S. Cl. ....................................... 210/19; 210/20; 210/349; 210/519; 210/521; 209/157; 209/456
[58] Field of Search .................... 210/19, 20, 202, 207, 210/208, 220, 221, 519, 521, 522, 349, 256, 259; 209/157, 455, 456

[56] References Cited

U.S. PATENT DOCUMENTS

| | | | |
|---|---|---|---|
| 2,570,304 | 10/1951 | Bach | 210/19 |
| 2,728,632 | 12/1955 | Matheson | 209/157 |
| 2,868,384 | 1/1959 | Puddington | 210/521 |
| 3,068,172 | 10/1962 | Leviel et al. | 210/19 |
| 3,307,702 | 3/1967 | Mackrle | 210/20 |
| 3,552,554 | 1/1971 | Olgard | 210/521 |
| 3,788,981 | 1/1974 | Richard et al. | 210/521 |
| 3,886,064 | 5/1975 | Kosonen | 209/157 |

FOREIGN PATENT DOCUMENTS 17980 of 1897 United Kingdom ...................... 210/521

Primary Examiner—Charles N. Hart
Assistant Examiner—Ernest G. Therkorn
Attorney, Agent, or Firm—Wenderoth, Lind & Ponack

[57] ABSTRACT

In a system for decantation treating of liquid containing therein suspended material, the liquid to be treated is pulsatingly introduced into the bottom of a sludge bed and pulsated therein. The liquid is passed upwardly through the sludge bed at a predetermined speed whereby the suspended material is agglomerated and removed from the liquid. The liquid is forced through the sludge bed from the bottom to the top thereof in paths which are inclined both to the horizontal and to the vertical. Specifically, the liquid passes generally upwardly through an assembly of inclined flow control devices which are positioned within the sludge bed throughout substantially the entire height thereof. Sludge settles within the inclined passageways between the flow control devices for a slight distance until the sludge contacts an inclined bottom wall. The sludge then slides downwardly in an inclined manner along the bottom wall in a concentrated path or current. This concentrated path or current forces the liquid upwardly and away from the bottom wall, thereby creating a generally upwardly moving inclined path or current of liquid. The settling sludge and rising liquid thereby form concentrated currents in parallel but opposite inclined directions and increase the tendency of the suspended material to be agglomerated from the liquid.

19 Claims, 5 Drawing Figures

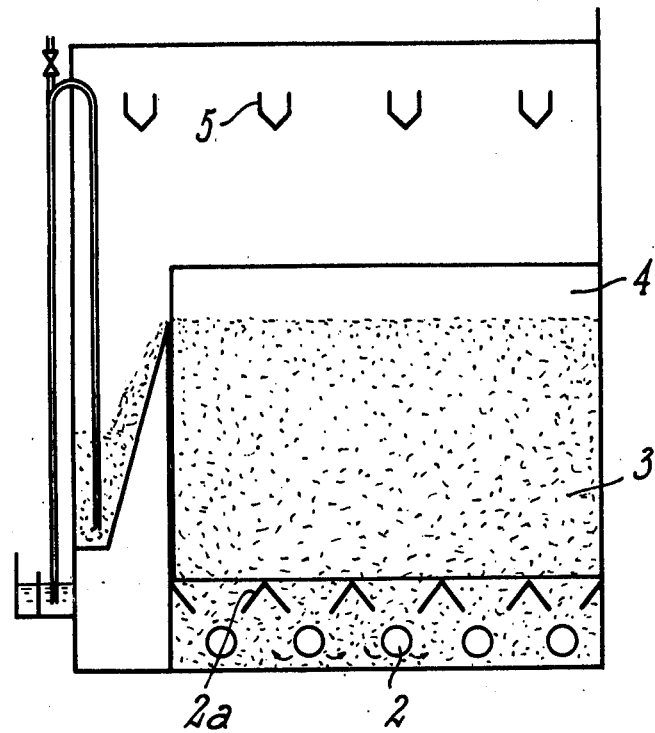
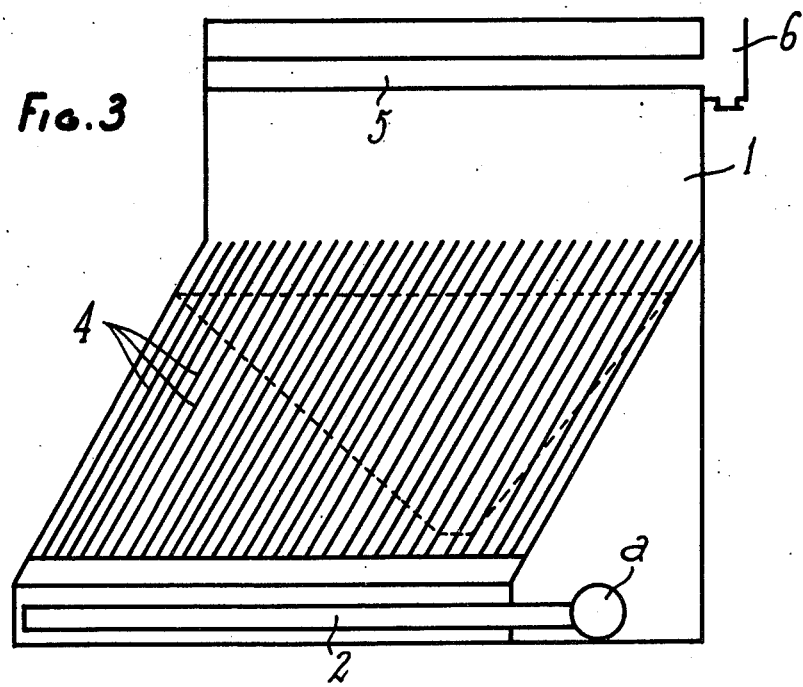

PULSATING SLUDGE BED WITH INCLINED PLATES

This is a continuation of application Ser. No. 782,499, filed Mar. 29, 1977, which is a continuation-in-part of application Ser. No. 600,562, filed July 30, 1975, which is a continuation of application Ser. No. 380,732, filed July 19, 1973, all now abandoned.

BACKGROUND OF THE INVENTION

The present invention relates to a method and an apparatus for decanting liquids of all natures, notably waste water, through a so-called "pulsated" sludge bed.

In hitherto known decanting systems, the liquid to be treated, notably water, to which suitable reagents such as coagulating agents, flocculating agents, pH correctors, activated carbon, etc., have been added, is caused to circulate upwardly through the previously formed sludge bed which is adapted to act by contact with the water and to promote the settling or agglomeration of the precipitates thus formed which are retained within the sludge bed proper together with the fine particles of materials in suspension in the liquid to be treated. Conventionally, the liquid to be treated is introduced into the apparatus at a uniform rate of flow, or according to the method disclosed in U.S. Pat. No. 3,068,172 the liquid is introduced intermittently into the apparatus and spread throughout the lower portion of the settling tank. The sludge bed, thereby regularly pulsated from the bottom to the top thereof, is kept in an expanded condition throughout its mass, whereby an intimate contact is maintained between the liquid to be treated and the sludge. The liquid circulates upwardly at a certain average speed in the tank, and this speed should preferably be kept as high as possible, without however impairing the sludge cohesion for a predetermined amount of decanted water.

In pulsated sludge bed decanting processes, two parameters are important in the promotion of flocculation and coagulation, i.e. the concentration of matter in suspension in the sludge bed, which is subordinate to the decanting rate and to the pulsation parameters, and the average upward flow rate of the liquid to be treated through the sludge bed, which rate should advantageously be as high as possible without breaking the cohesion of the sludge.

The size of the settling tanks, and therefore the necessary investment costs, are closely dependent on the average upward flow rate of the liquid to be treated. This rate is obviously limited by the risk of carrying along sludge in the upward stream of liquid, and therefore causing a loss of sludge by entrainment.

SUMMARY OF THE INVENTION

It is the primary object of the present invention to provide an improvement in the decantation process and apparatus described in U.S. Pat. No. 3,068,172, such improvement consisting in either promoting the natural tendency of the sludge to accumulate in the tank bottom, and consequently improving the concentration of particles in suspension in the sludge so that, given the same average upward flow rate of the liquid to be treated, an improved flocculation and a better quality of treated water product are obtained, or considerably increasing the average upward flow rate of the liquid to be treated while obtaining an equivalent treated water quality, thus affording substantial savings by reducing the size of the apparatus utilized for carrying out the process. Alternatively, a combination of these two procedures may be employed.

Depending on the specific nature of the liquid to be treated and the problems involved in the resultant specific circumstances, it is possible to extend the operating time or useful life of the filter interposed at the exit end of the decanter, and to use decanting systems requiring a reduced floor area, for an equivalent output of liquid to be treated and equivalent amounts of flocculating and coagulating reagents. Therefore, substantial savings are made and better results are achieved than are possible with conventional sludge bed systems.

The present invention provides an improved decantation method and apparatus of the so-called "pulsated" sludge bed type, wherein there are created within the sludge bed preferential currents capable of modifying the behavior of the sludge in order to promote the tendency of the sludge to agglomerate while permitting the flow of liquid to be treated through the sludge bed at particularly high generally upward flow rates. These preferential currents are obtained by means of an assembly of flow control means such as tubes, plane or corrugated plates, or their equivalents, disposed throughout substantially the entire height of the sludge bed and inclined both to the horizontal and to the vertical, at an angle preferably in the range of from 45° to 70°. As employed herein, the term "flow control means" is intended to define structural elements such as those mentioned above which operate to control the direction of flow of the liquid to be treated in the generally upward direction through the sludge bed, and to control the direction of movement of settling sludge in a generally downward direction.

It is known to employ inclined plates in clarifiers, i.e. devices for carrying out a sedimentation or clarifying operation. Very recently, as embodied in U.S. Pat. No. 3,788,981, it has become known to use inclined plates in the clarifying zone of a sludge blanket or sludge bed type system.

The present invention however is based on the completely and totally new discovery that by the introduction of a carefully designed system of inclined flow control means, such as plates or tubes, into the sludge bed itself, it is possible to combine the action of the sludge bed itself with the concept of parallel-plate clarification, thereby completely unexpectedly very greatly increasing the agglomeration of the sludge bed and resulting in a quite amazing increase in the capacity of a pulsated type sludge blanket system.

The present invention is based on the discovery that the decantation of water loaded with matter in suspension therein takes place much more rapidly (the increment in the decantation rate being of the order of three to four times) in a tube inclined at a predetermined angle to the horizontal than in a vertical tube. In an inclined tube, a more concentrated sludge is obtained much more rapidly, because the tube inclination facilitates the decantation. That is, when the upward flow of the liquid to be treated is strictly vertical, the upward movement of the liquid tends to retard the downward settling movement of the sludge throughout the entire height of movement of the liquid upwardly. However, by passing the liquid generally upwardly through inclined flow control means such as an inclined tube, the sludge settles strictly vertically for only a short distance and then contacts the lower wall surface of the inclined tube. The sludge slips along the lower surface of the tube and forces the rising water away from the tube bottom, thus creating preferential currents attended by the continuous settling and agglomeration of sludge. These currents develop immediately when the first solid particles of the sludge slip along the inclined lower tube walls and accelerate as the particle deposition promoted thereby takes place. Therefore, the sludge settles very rapidly and agglomerates not only by inherent gravity, but also under the influence of such currents.

Under these conditions, according to the present invention, an assembly or set of flow control means, such as inclined tubes, is disposed in a sludge bed, and a general modification of the characteristics of the sludge bed is obtained. Specifically, the sludge is caused to strongly concentrate, and additionally a self-induced stirring motion is set up, thereby promoting the coagulation and flocculation by increasing the probability that sludge particles of the sludge bed will intercept colloids within the liquid being treated which have not yet been trapped.

On the other hand, it has further been found that when sludge contained in an inclined tube is submitted to a rising water current having the same speed as a water current rising through sludge contained in a vertical tube, the more concentrated sludge in the inclined tube occupies but a small volume in the tube. Consequently, if it is desired to obtain the same sludge expansion in the inclined tube as in the vertical tube, the water current may flow at a higher flow rate (of the order of two to three times, depending on the angle of inclination of the tube) in the inclined tube than in the vertical tube, while achieving at least the same quality of purified water.

Thus, if according to the present invention an assembly or set of flow control means, such as inclined tubes forming an angle of, e.g. 45° to 70° to the horizontal, is positioned to extend substantially throughout the entire height of the sludge bed, it is possible not only to obtain a higher sludge bed concentration, given an equal upward liquid flow rate, but also, due to the natural tendency of the sludge to settle, to increase the upward flow rate of the liquid to be treated while maintaining the initial sludge concentration.

The preferential currents of sludge and treated liquid thus formed extend substantially rectilinearly, i.e. in a generally downward direction for the sludge, and in a generally upward direction for the treated water.

By the arrangement of the flow control means, such as plates or tubes, within the sludge bed itself throughout the entire height thereof, and in an inclined manner, there are created concentrated currents of the liquid going upwardly and the sludge settling downwardly. This prevents the opposite movement of these two flows from impeding the progress of each other, and in fact results in the flow in both directions being increased. The result of this phenomenon is that the overall efficiency of the sludge bed treatment system is improved. Specific operational tests have shown that ascensional velocities of the liquid to be treated through the system of the present invention may be as high as 12 or even 15 m/h. This is compared with a performance of a device according to U.S. Pat. No. 3,788,981 of up to 6.5 m/h. Further, the total contact time in the system of the present invention is approximately 15 to 20 minutes as compared with 60 minutes for the system of U.S. Pat. No. 3,068,172, and with 40 to 45 minutes for the system of U.S. Pat. No. 3,788,981.

According to a further advantageous feature of the present invention, the above defined preferential currents are modified to produce whirling or eddy effects therein, which promote decantation and recirculation of sludge in the vicinity of these eddy currents, and therefore improve the flocculation.

BRIEF DESCRIPTION OF THE DRAWINGS

The method and apparatus of the present invention will be further described in detail below with reference to a preferred embodiment thereof, with reference to the attached drawings, wherein:

FIGS. 2 and 3 are schematic sections taken along the lines II—II and III—III of FIG. 1, respectively;

DETAILED DESCRIPTION OF THE INVENTION

Figure 1:
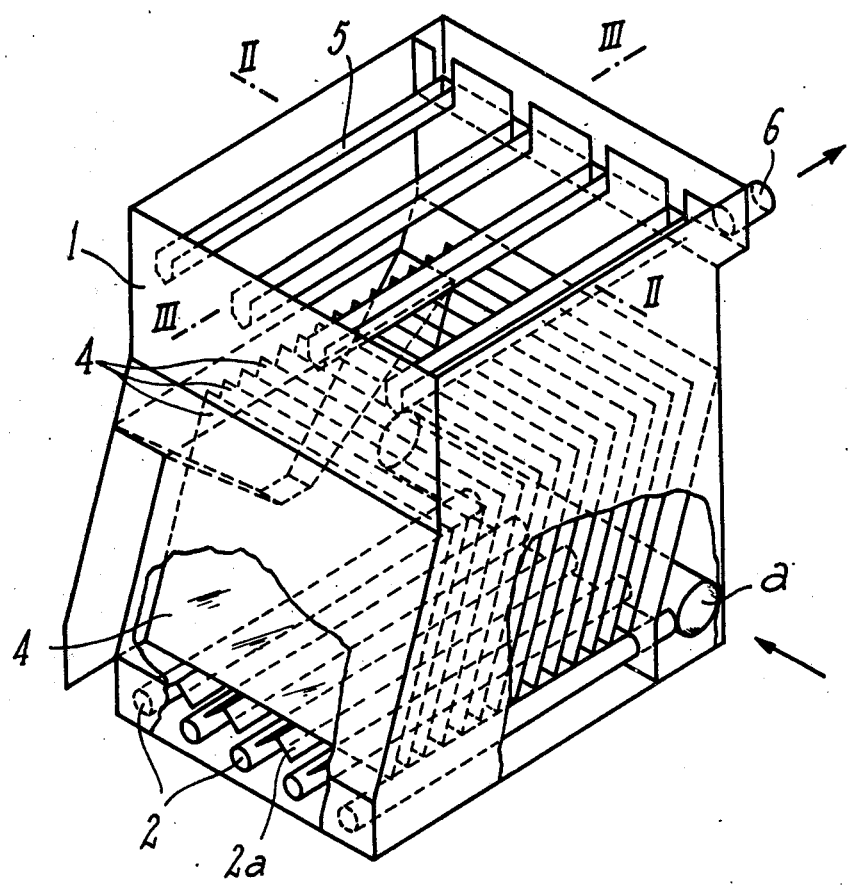
FIG. 1 is a schematic perspective view, with parts broken away, of an apparatus according to the present invention.

Referring first to FIG. 1, the apparatus illustrated therein comprises a tank 1 into which the liquid to be treated (for example water) is pulsatingly introduced at a, this liquid being subsequently distributed throughout the bottom portion of the tank 1 by means of branch pipes or like elements 2 and 2a, in a manner disclosed in U.S. Pat. No. 3,068,172. Thus, the liquid to be treated is distributed uniformly throughout the bottom area of the tank 1, and the sludge constitutes a uniform suspension.

An assembly of flow control means 4 according to the present invention, consisting of tubes, plates, or the like, inclined by 45° to 70° to both the horizontal and the vertical, are disposed within the sludge bed 3 to extend throughout substantially the entire height thereof. The liquid to be treated is passed generally upwardly through the sludge bed at a predetermined speed, while suspended material is agglomerated and removed from the liquid. After passage through the sludge bed, the liquid continues to pass upwardly through a sedimentation zone to clarify the liquid. The decanted water is discharged through an outlet pipe 6 by means of a known arrangement comprising spouts 5.

Figure 4:
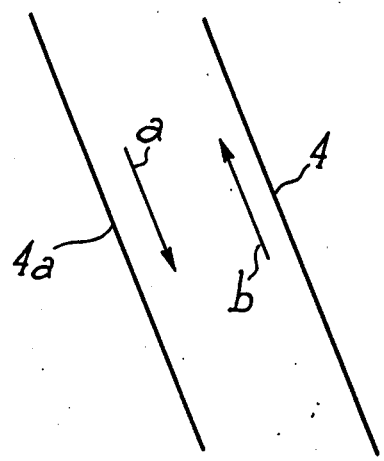
FIG. 4 is a schematic fragmentary section taken between two adjacent plates, according to a first embodiment of the present invention.

FIG. 4 illustrates diagrammatically the arrangement of two adjacent plates 4, 4a, disposed in the sludge bed of the apparatus. The arrows a and b show the substantially rectilinear direction of the preferential currents or paths imparted due to the inclination of the plates. The downwardly settling sludge slips in the direction a on the lower plate 4a of the compartment concerned, and the upwardly rising liquid is pushed away from lower plate 4a by the sludge and rises in the direction b. Thus, the plates 4 and 4a act to control and regulate the direction, speed and concentration of the settling sludge, and thereby the direction and speed of the rising liquid to be treated.

Figure 5:
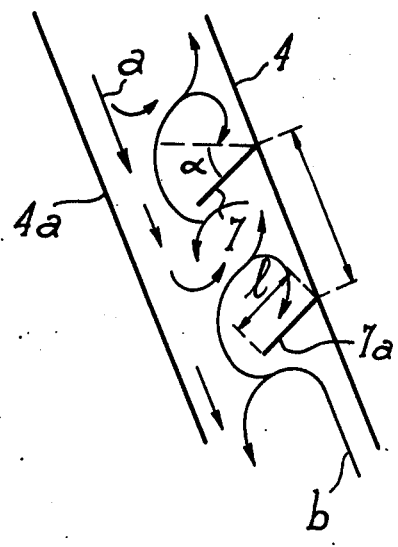
FIG. 5 is a view similar to FIG. 4, but showing another embodiment of the present invention.

FIG. 5 illustrates diagrammatically a further feature of the invention wherein the two plates 4 and 4a are provided with baffles 7 and 7a adapted to produce eddy effects in the preferential currents.

These baffles comprise small plates having a length l which may be as great as 2 L/3, wherein L designates the relative spacing between plates 4 and 4a. The baffles form with the horizontal an angle $\alpha$ of a value within the range of 20° to 70°, depending on the quality of the sludge obtained.

These baffles 7 and 7a may consist of any suitable material (plastic, metal, etc.), and more particularly of the same material as that constituting plates 4.

On a given plate 4 are provided a suitable number of baffle plates 7 and 7a, as illustrated in FIG. 5. The distance H between two successive baffle plates 7 and 7a is preferably of about 1 to 5 times the distance L, i.e. $L<H<5L$.

During the operation of the apparatus, the sludge slips in the direction a on the lower plate 4a of the compartment involved. The liquid from the settled sludge, in the bottom of the apparatus, rises (as shown by the arrow b). The thus treated liquid, of which the flow is modified by the baffle plates 7 and 7a, is caused to contact the sludge slipping along the plate 4a. Under these conditions, an eddy current is created which is attended by the settling of sludge at the level of the baffle plates. Then the water resumes its upward flow, and one fraction of the sludge is deposited on the upper surface of the baffle plates. This sludge slips in turn on the baffle plates and is caused to contact the water flowing from the bottom of the apparatus. In FIG. 5, the small arrows designate diagrammatically the eddy currents created by the baffle plates 7 and 7a.

Under these conditions, a double recirculation of sludge takes place at several levels, actually at the level of each baffle plate, thus promoting flocculation and affording the production of a better sludge quality. The efficiency of the method of this invention is thus improved, and it may be pointed out once again that with this method, it is possible, depending on the specific circumstances involved, to either use a sludge bed having a high concentration of matter in suspension, so as to obtain treated water of higher quality without altering the average upward rate of flow of the liquid to be treated, or to obtain an equivalent quality of treated water by increasing to a substantial degree the upward rate of flow of the liquid to be treated. A further alternative consists in combining these two possibilities.

Although typical embodiments of this invention have been shown and described herein, it will readily occur to those skilled in the art that they are given by way of example only, and not of limitation. Therefore, various modifications may be made to these embodiments without departing from the basic principle of the invention, as set forth in the appended claims.

What is claimed is:

1. In a method of decantation treating liquid containing therein suspended material, particularly waste water, by pulsatingly introducing said liquid into the bottom of a sludge bed and thus pulsating said sludge bed, passing said liquid upwardly through said sludge bed at a predetermined speed and agglomerating and removing a portion of said suspended material from said liquid, and immediately thereafter continuing to pass said liquid upwardly from the top of said sludge bed through a sedimentation zone to clarify said liquid, the improvement wherein:

said step of passing said liquid upwardly through said sludge bed comprises:

forcing all of said liquid through said sludge bed, from the bottom to the top thereof, in paths which are inclined both to the horizontal and to the vertical, by forcing all of said liquid to pass upwardly through an assembly of flow direction control means positioned within said sludge bed throughout substantially the entire height thereof, and causing the sludge of said sludge bed to settle; and causing the rising liquid and settling sludge to form in concentrated currents in parallel but opposite inclined directions, and increasing the tendency of said sludge to agglomerate.

2. A method as claimed in claim 1, further comprising causing said concentrated currents of rising liquid and settling sludge to whirl while moving in said parallel but opposite inclined directions, thereby forming eddy currents and still further increasing the tendency of said sludge to agglomerate.

3. In an apparatus for the decantation treatment of liquid containing therein suspended material, particularly waste water, said apparatus including a tank having in the bottom thereof a pulsated sludge bed forming an agglomerating zone, a sedimentation zone directly above and in communication with said sludge bed for clarifying said liquid, an inlet means for pulsatingly receiving said liquid from a pulsating supply source and for introducing said liquid into the bottom of said tank, header and branch pipe means for passing said liquid from said inlet means into the bottom of said sludge bed to thus pulsate said sludge bed, for passing said liquid upwardly through said sludge bed at a predetermined speed to agglomerate and remove a portion of said suspended material from said liquid, and for immediately thereafter continuing to pass said liquid upwardly from said sludge bed through said sedimentation zone, and clarified liquid and sludge outlets, the improvement comprising:

an assembly of flow direction control means positioned within said sludge bed throughout substantially the entire height thereof, from a position above said header and branch pipe means, for forcing all of said upwardly passing liquid to pass upwardly through said sludge bed, from the bottom to the top thereof, in paths which are inclined both to the horizontal and to the vertical, the sludge in said sludge bed settling; and said flow direction control means having surface means inclined both to the horizontal and to the vertical for causing said rising liquid and settling sludge to form in concentrated currents in parallel but opposite inclined directions, thereby increasing the tendency of said sludge to agglomerate.

4. The improvement claimed in claim 3, wherein said flow direction control means comprise a plurality of parallel tubes inclined to the horizontal at an angle of from 45° to 70°.

5. The improvement claimed in claim 4, wherein said tubes extend to a position above the top of said sludge bed.

6. The improvement claimed in claim 4, further comprising means connected to said tubes for causing said concentrated currents of rising liquid and settling sludge to whirl while moving in said parallel but opposite inclined directions and to thereby form eddy currents, thereby still further increasing the tendency of said sludge to agglomerate.

7. The improvement claimed in claim 6, wherein said whirl causing means comprises baffle plates connected to said tubes.

8. The improvement claimed in claim 7, wherein said baffle plates are inclined to the horizontal at an angle of from 20° to 70°.

9. The improvement claimed in claim 7, wherein the distance between adjacent of said baffle plates is one to five times the distance between adjacent of said tubes.

10. The improvement claimed in claim 7, wherein the length of said baffle plates is no more than two-thirds the distance between adjacent of said tubes.

11. The improvement claimed in claim 3, wherein said flow direction control means comprise a plurality of parallel plates inclined to the horizontal at an angle of from 45° to 70°.

12. The improvement claimed in claim 11, wherein said plates extend to a position above the top of said sludge bed.

13. The improvement claimed in claim 11, further comprising means connected to said tubes for causing said concentrated currents of rising liquid and settling sludge to whirl while moving in said parallel but opposite inclined directions and to thereby form eddy currents, thereby still further increasing the tendency of said sludge to agglomerate.

14. The improvement claimed in claim 13, wherein said whirl causing means comprises baffle plates connected to said parallel plates.

15. The improvement claimed in claim 14, wherein said baffle plates are inclined to the horizontal at an angle of from 20° to 70°.

16. The improvement in claim 14, wherein the distance between adjacent of said baffle plates is one to five times the distance between adjacent of said parallel plates.

17. The improvement claimed in claim 14, wherein the length of said baffle plates is no more than two-thirds the distance between adjacent of said parallel plates.

18. The improvement claimed in claim 11, wherein said parallel plates comprise flat-surfaced plates.

19. The improvement claimed in claim 11, wherein said parallel plates comprise corrugated plates.

* * * * *

UNITED STATES PATENT AND TRADEMARK OFFICE
CERTIFICATE OF CORRECTION

PATENT NO. : 4,156,644
DATED : May 29, 1979
INVENTOR(S) : YVES-ROBERT RICHARD

It is certified that error appears in the above-identified patent and that said Letters Patent are hereby corrected as shown below:

Page 1, insert the following Foreign Application Priority Data:

-- August 25, 1972    France................72 30.328

March 30, 1973    France................73 11.523 --.

Signed and Sealed this

Thirteenth Day of November 1979

[SEAL]

Attest:

RUTH C. MASON
*Attesting Officer*

LUTRELLE F. PARKER
*Acting Commissioner of Patents and Trademarks*